(12) United States Patent
Triller et al.

(10) Patent No.: US 8,133,144 B2
(45) Date of Patent: Mar. 13, 2012

(54) PLANETARY TRANSMISSION WITH CONTINUOUSLY VARIABLE TRANSMISSION RATIO

(75) Inventors: Andreas Triller, Bühl (DE); Andreas Englisch, Bühl (DE); Peter Tenberge, Chemnitz (DE); Rico Resch, Wilsdruff (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 492 days.

(21) Appl. No.: 12/316,573

(22) Filed: Dec. 12, 2008

(65) Prior Publication Data
US 2009/0215570 A1 Aug. 27, 2009

Related U.S. Application Data

(60) Provisional application No. 61/007,403, filed on Dec. 12, 2007.

(51) Int. Cl.
*F16H 15/48* (2006.01)

(52) U.S. Cl. ...................................................... 475/185

(58) Field of Classification Search .................. 475/183, 475/185, 190, 191, 192, 193, 269, 331, 340
See application file for complete search history.

(56) References Cited

U.S. PATENT DOCUMENTS

| 1,770,408 | A | * | 7/1930 | Jacobsen | 475/185 |
| 4,098,145 | A | * | 7/1978 | Dickinson | 475/186 |
| 7,909,723 | B2 | * | 3/2011 | Triller et al. | 475/189 |

* cited by examiner

*Primary Examiner* — David D Le
*Assistant Examiner* — David J Hlavka
(74) *Attorney, Agent, or Firm* — Alfred J. Mangels

(57) ABSTRACT

A planetary transmission having a continuously variable transmission ratio. The transmission includes two sun wheels having sun wheel circumferential surfaces, and that are axially spaced and rotatable independently of each other around the same axis of rotation. A ring wheel is situated on the same axis as the sun wheels and has an internal circumferential surface. Planet wheels are provided having planet wheel circumferential surfaces that are in frictional contact with the internal circumferential surface of the ring wheel and the sun wheel circumferential surfaces. A web element is also provided, and the planet wheels are each rotatable about an associated planet wheel axle, which is guided in the web element so that it is movable in the radial direction relative to the transmission longitudinal axis.

9 Claims, 4 Drawing Sheets

PLANETARY TRANSMISSION WITH CONTINUOUSLY VARIABLE TRANSMISSION RATIO

BACKGROUND OF THE INVENTION

1. Field of the Invention

The present invention relates to a planetary transmission having a continuously variable transmission ratio.

2. Description of the Related Art

Transmissions having a continuously variable transmission ratio, which are also referred to as variable speed drives, are known in the form of belt-driven transmissions on the one hand, for example belt-driven conical-pulley transmissions in which the power is transmitted via traction means such as V-belts, plate-link chains, or thrust link chains, and on the other hand as frictional transmissions. Examples of frictional transmissions are toroidal transmissions and conical ring transmissions. The planet wheels in such frictional transmissions must be supported, tilted, and clamped by means of components provided especially for those purposes.

A planetary friction wheel transmission is also known in which a planet carrier is not absolutely necessary, since the planet wheel circumferential surfaces and the sun wheel circumferential surface in combination with the inner circumferential surface of the ring wheel and the mutual frictional contact are so shaped that the planet wheels are held axially by the frictional contact with the sun wheel and the ring wheel.

At the same time, a system is provided in a known planetary transmission having a continuously variable transmission ratio, in which two sun wheels are provided that are rotatable around the same axis of rotation at an axial distance from each other, both of which have sun wheel circumferential surfaces. One of the sun wheels can be connected to a shaft in a rotationally fixed connection, while the other sun wheel is rotatably supported on the shaft and biased in the direction of the firmly connected sun wheel, so that the necessary clamping between the sun wheels and the planet wheels for a frictional transmission is achieved.

Furthermore, in the planetary friction transmission a ring wheel situated on the same axis with the sun wheels is provided having a radially inner internal circumferential surface, as well as planet wheels having planet wheel circumferential surfaces that are each in frictional contact with the ring wheel internal circumferential surface and the sun wheel circumferential surfaces. The ring wheel can be shifted axially relative to the sun wheels, in which case the sun wheel circumferential surfaces, the planet wheel circumferential surfaces and the internal circumferential surface of the ring wheel are formed in such a way that when the ring wheel is shifted axially relative to the sun wheels, the axes of rotation of the planet wheels are tipped relative to the axis of rotation of the sun wheels, and the transmission ratios between the ring wheel and each of the sun wheels change in the opposite direction. To that end, the planet wheel circumferential surfaces, which are in frictional contact with the sun wheels, taper toward the end faces of the planet wheels, and the sun wheel circumferential surfaces taper toward the end faces of the sun wheels that are facing each other.

Alternatively, the planet wheel circumferential surfaces taper in the direction away from the end faces of the planet wheels, and the sun wheel circumferential surfaces taper from the end faces of the sun wheels facing away from each other. Furthermore, with that design a separator element is introduced, so that the planet wheels are held at substantially the same circumferential distance from one another. The separator element does not influence the tipping possibility of the planet wheels. It extends into intermediate spaces between the planet wheels and into a groove provided on the planet wheels between the planet wheel circumferential surfaces, which are in frictional contact with the sun wheel circumferential surfaces.

During the transmission of torque between input and output drives in such a planetary friction transmission, a tipping moment or tilt moment is produced because of the frictional contact of the planet wheels with the sun wheel and the ring wheel, which moment twists the planet wheels around an axis perpendicular to their axes of rotation. The contours of the planet wheel circumferential surfaces and of the internal circumferential surface of the ring wheel are so shaped that the tipping moment shifts the planet wheels radially inward and reinforces the clamping between the sun wheel circumferential surfaces, the planet wheel circumferential surfaces, and the internal circumferential surface of the ring wheel. The tipping of the rolling elements or planet wheels under the influence of the drive torque can be utilized for self-acting, torque-dependent clamping. Of course, the tipping of the planet wheels produces skewing at the contact points, which can result in slippage and cause losses (a temperature increase at the contact points), so that overall a reduction of the transmittable useful torque results.

Starting from that background, an object of the present invention is to provide a planetary transmission having a continuously variable transmission ratio, and which improves the efficiency of a rolling planetary transmission of the type described earlier and which improves the flexibility of utilization of the planetary transmission, in particular in regard to multiple adjustable transmission ratio ranges.

SUMMARY OF THE INVENTION

Briefly stated, in accordance with one aspect of the present invention a planetary transmission having a continuously variable transmission ratio is provided. The transmission includes two sun wheels each having sun wheel circumferential surfaces, wherein the sun wheels are rotatable independently of each other around the same axis of rotation and are at an axial distance from each other. A ring wheel is situated on the same axis of rotation as the sun wheels and has an internal circumferential surface, and planet wheels are provided having planet wheel circumferential surfaces that are in frictional contact with the internal circumferential surface of the ring wheel and with the sun wheel circumferential surfaces.

In addition, a web element is provided that radially guides the radially movable planet axles of the planet wheels, which are each rotatable around an associated planet wheel axle, in such a way that the possibility of the planet wheels tipping in a direction about an axis perpendicular to the planet wheel axle, in particular about the axis (Z axis) that extends in the radial direction of the planetary transmission, is limited. To that end, the planet wheels are supported so that they can rotate around the planet wheel axles that are provided. The plant wheel axles are guided in the web element so that they are movable in the radial direction, and so that tipping around the Y-axis, i.e., the axis that extends tangentially to the circumferential direction of the planetary transmission, remains possible.

The invention is thus based on the idea of limiting the inclination, or tipping, or tilting of the planet wheels, with the result that the losses occurring in the planetary transmission because of slipping movements at the contact points are reduced, which improves the operating efficiency of the transmission. At the same time, the separator element can be eliminated, since the positions of the planet wheels relative to each other in the circumferential direction are fixed by the web element.

If the web element is movable in the axial direction of the transmission together with the planet wheels, in accordance with a preferred embodiment, a change in the transmission ratio of the transmission can be effected by shifting the web axially.

In accordance with a preferred embodiment, the planet wheel axles are guided in the web element in the regions of their two opposite ends. As a result, depending upon the possibility or distance of movement of the axle ends, the guidance of the axles can define a certain maximum skewing around the Y-axis. In principle, it is also conceivable to provide the web element on only one side of the planet wheels and to keep the other ends of the planet wheel axles essentially freely movable, although an additional securing option should then be provided at the guided end of the axles so that they do not escape the guidance of the single web element, and a means must be provided to essentially stop the tipping of the axles about the Z axis of the transmission.

Preferably, a single common web element is provided for all planet wheel axles. In principle, it is also conceivable to provide a plurality of independent web elements for the individual planet wheels, whose positions are fixed relative to each other if necessary. That increases the cost of manufacturing, however. Furthermore, two web elements that are independent of each other can be provided, wherein the ends of the planet axles are guided in the axial direction on one side in a first web element, while the ends of the planet wheel axles are guided in the axial direction at the other end in a second web element. Preferably, in that case the web elements are mounted on a common carrier zone, for example a shaft sleeve, so that they are movable synchronously with each other and their position relative to each other in the circumferential direction is fixed. Alternatively and preferably, a web element is provided that includes a first region for a first end of the planet wheel axles in the axial direction and a second region for a second end of the planet wheel axles in the axial direction.

In accordance with a preferred embodiment, the web element is non-rotatably connected to a gear, so that an input drive torque can be introduced into the web element or an output torque can be extracted from it. That makes it possible to enable a drive input to or a drive output from the web, as well as to fix the position of the web, which results in a greater variety of transmission ratio ranges in the planetary friction transmission or planetary rolling transmission.

To fix the axial position of the web element, it is preferably non-rotatably connected to a planetary housing. If the multiplicity of transmission ratio possibilities is not necessary, the web element can also be non-rotatably connected in principle to a transmission housing.

In accordance with a preferred embodiment, the web element is provided with a shaft sleeve, with which it is supported on the shaft of at least one sun wheel, so that it cannot be shifted radially but is movable axially. In that case one of the sun wheels is preferably integrally formed with the shaft or is non-rotatably connected to it, while the other sun wheel is supported through a bearing so that it can rotate relative to the shaft. The shaft sleeve contributes to determining the exact position of the web when there are changes in the transmission ratio, so that the desired transmission ratio can be finely adjusted and a collision between the planet wheels and the web can be prevented.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
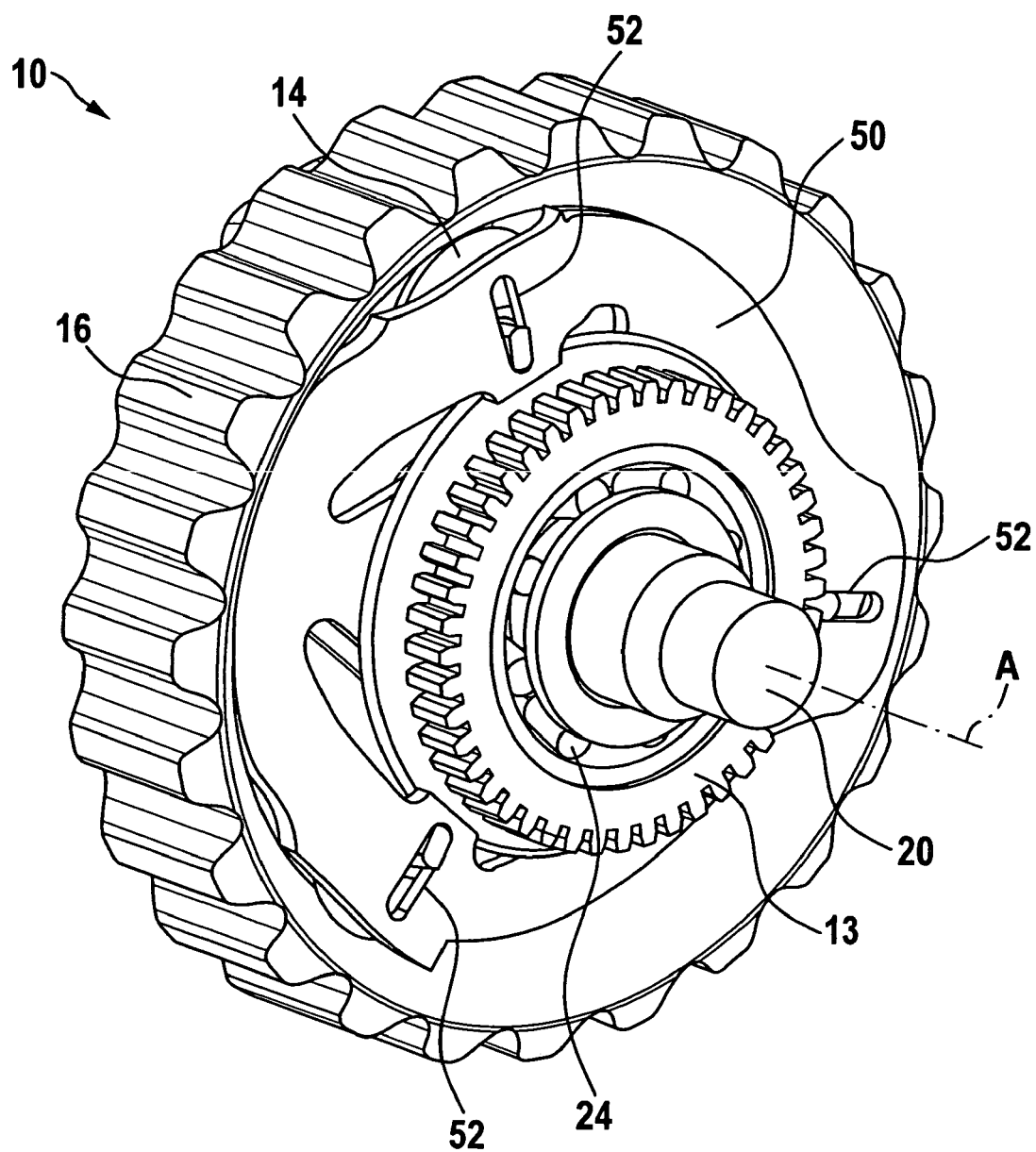
FIG. 1 is a perspective view of a planetary transmission in accordance with an embodiment of the present invention and having a continuously variable transmission ratio.
Figure 2:
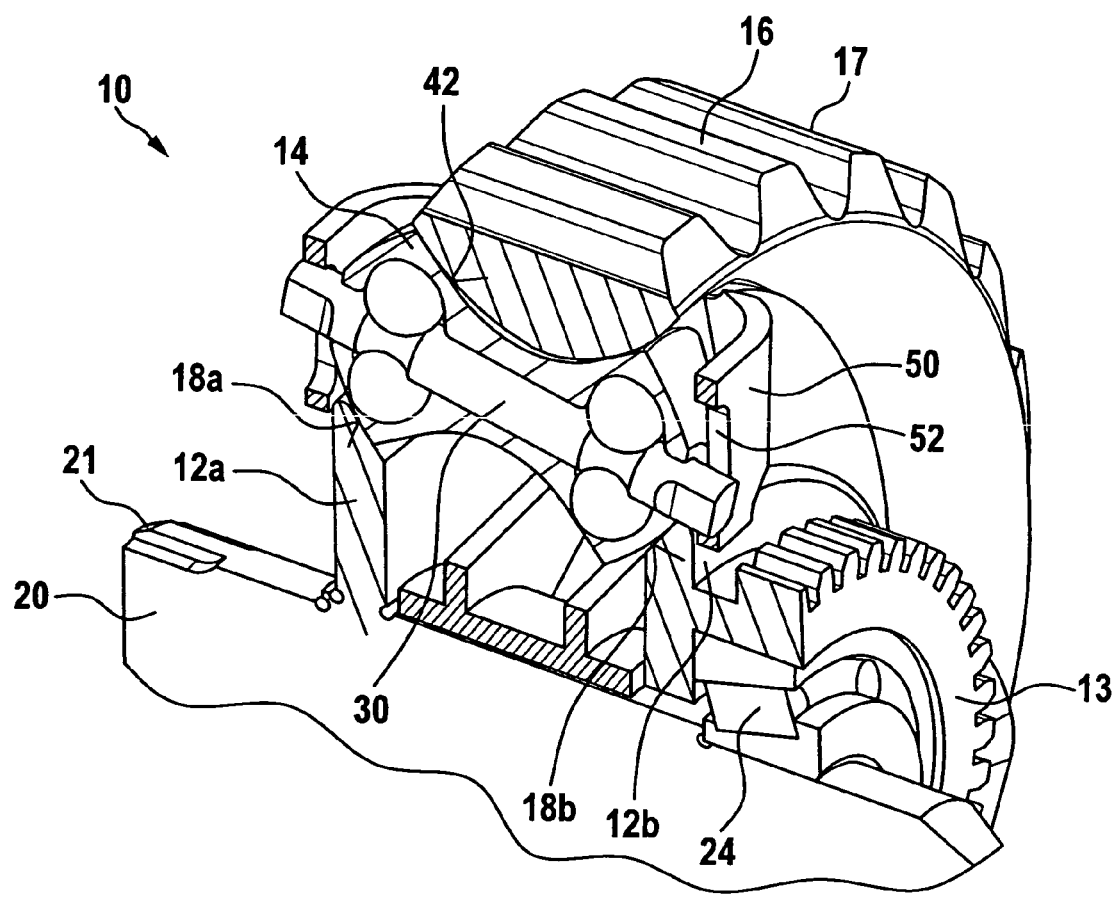
FIG. 2 is a perspective longitudinal sectional view through the planetary roller transmission shown in FIG. 1.

FIGS. 1 and 2 show a planetary transmission 10 having a continuously variable transmission ratio. Planetary transmission 10 includes two sun wheels 12a, 12b, three planet wheels 14, and one ring wheel 16. The sun wheels 12a, 12b taper toward their opposite end faces, so that their frictional surfaces (sun wheel circumferential surfaces) 18a, 18b are in the shape of a truncated circular cone. Sun wheel 12a is integrally formed with a shaft 20 of the planetary transmission, or it can be a separate component that is rigidly connected to the shaft 20. Sun wheel 12b, which is axially spaced along shaft 20 from sun wheel 12a, is mounted on shaft 20 so that it can rotate relative thereto by means of a bearing 24, for example a tapered roller bearing. The side of planetary transmission 10 with the sun wheel 12b that is rotatable relative to shaft 20 is the input drive side of the planetary transmission, while the side of planetary transmission 10 with the sun wheel 12a that is rigidly connected to shaft 20 is the output side. Sun wheel 12b carries teeth 13, through which an input drive torque can be introduced. In addition or alternatively, teeth can also be provided integrally on sun wheel 12a, as in the case of sun wheel 12b, in order to extract an output torque. The teeth can also be in the form of shaft teeth 21, as shown in FIG. 2. Sun wheel 12b is biased in the axial direction relative to sun wheel 12a, for example by a spring (not shown), as a means of applying axial pressure, and is axially movable along shaft 20.

Ring wheel 16 advantageously has an annular form and is provided with teeth 17 on its external circumferential surface, so that torque can be introduced into or extracted from ring wheel 16. The internal circumferential surface 42 of ring wheel 16 has a cross section of circular segment shape in the radial direction, and defines a frictional surface to engage with corresponding frictional surfaces on the bodies of the planet wheels 14.

Ring wheel 16, sun wheels 12a, 12b, and shaft 20 are rotatable about a common axis of rotation A.

Figure 4:
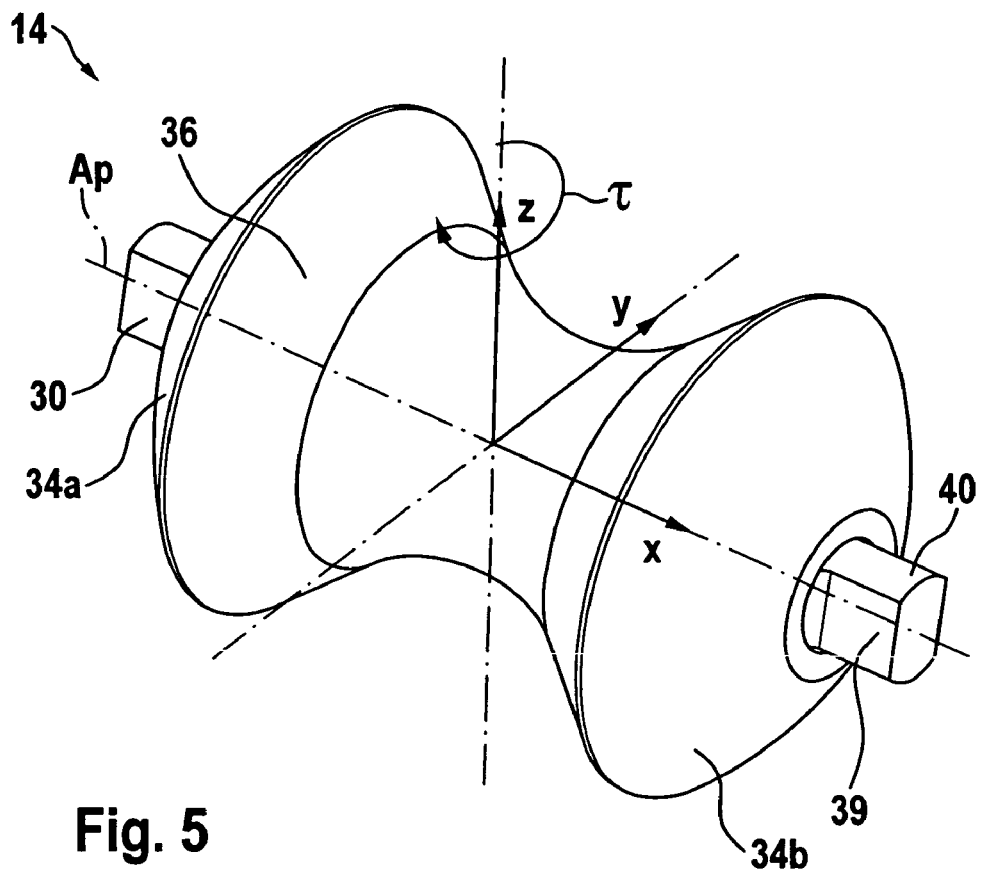
FIG. 4 is a perspective view of a planet wheel and of an associated planet wheel axle.
Figure 5:
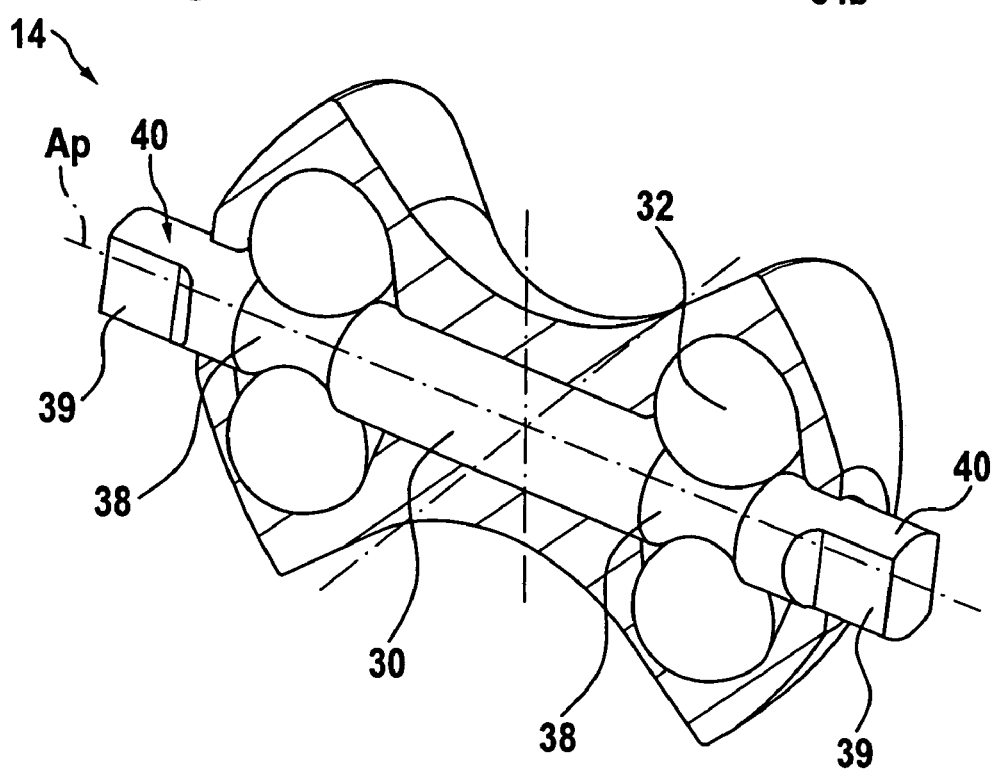
FIG. 5 is a perspective longitudinal sectional view of the planet wheel and planet wheel axle shown in FIG. 4.

The planet wheels 14 are shown in more detail in FIGS. 4 and 5. They each have an axis of rotation $A_P$ (the X-axis in FIG. 4), about which they are rotatably supported on an axle 30. Ball bearings (two in each case) are provided for that purpose, as can be seen in FIG. 5, spaced at a distance in the axial direction along the axis of rotation $A_P$. For that purpose, the axle 30 of each planet wheel 14 is provided with two axially-spaced grooves 38 within which balls of the ball bearing 32 roll. Furthermore, the axle is essentially in the form of a circular cylinder, with its ends being flattened, so that two parallel flat surfaces are present as axially extending flattened ends 39 in the end regions 40 of the axle. The end regions 40 of the axles 30 are thus tapered to a substantially rectangular cross-sectional shape, with opposed curved surface regions and opposed rectilinear surface regions.

The planet wheels 14 include outer circumferential regions 34a, 34b at their outer ends which taper toward their end faces, and which are shaped to come to bear in each case against a sun wheel circumferential surface 18a, 18b of a sun wheel 12a, 12b, respectively. A concavely curved inner circumferential surface region 36 connects the convexly curved outer circumferential surface regions 34a, 34b, and is adapted to come into frictional contact with the inner circumferential surface 42 of ring wheel 16. Because of the frictional contact therebetween, torque can thus be transmitted between inner circumferential region 36 of the surface of planet wheel 14 and inner circumferential region 42 of ring wheel 16. In a corresponding manner, one of the outer circumferential regions 34a, 34b of planet wheel 14 is in contact with one of the sun wheel circumferential surfaces 18a, 18b of sun wheels 12a, 12b, so that torque can be transmitted therebetween.

Figure 3:
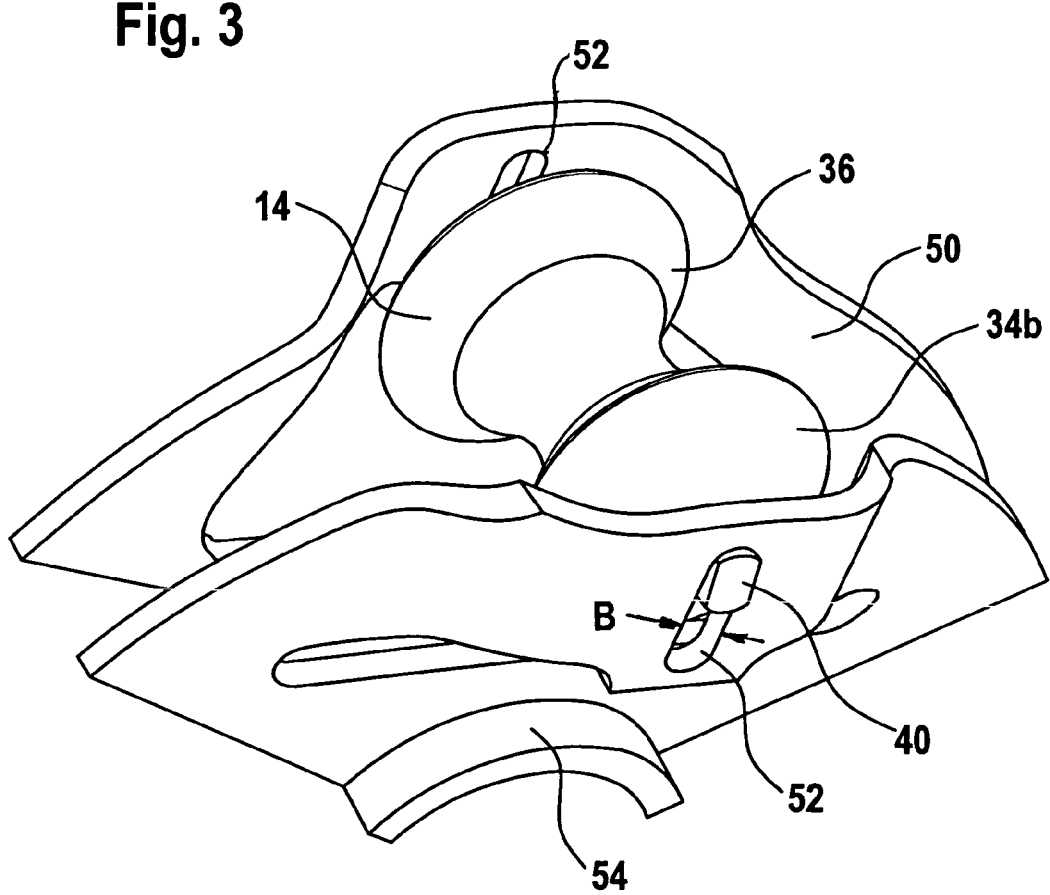
FIG. 3 is a fragmentary perspective view of a web element supporting a planet wheel.

The planet wheels 14 are supported by the planet wheel axles 30 in a web element 50 provided in planetary transmission 10 so that they can be shifted in the radial direction of axis A of planetary transmission 10 (see FIGS. 1 through 3). The planet wheels are supported in such a way that the two end regions 40 of a planet wheel axle can each be shifted in the radial direction relative to axis A, and can be tipped as needed about an axis extending in the tangential direction of the planetary transmission (the Y axis as shown in FIG. 4). To that end, web element 50 is provided with longitudinal slots 52 corresponding in number to the number of planet wheel axles, and which extend in the radial direction relative to axis A and along which the flattened ends 39 at the end regions 40 of the planet wheel axles can slide. Preferably web element 50 is so shaped that it can guide each of the two opposed end regions 40 of the planet wheel axles in a respective slot 52 provided for that purpose, so that the axles can be moved in the radial direction relative to axis A, as can be seen in FIGS. 2 and 3.

As shown in FIG. 2, by shifting the end regions 40 of the planet wheel axles 30 appropriately within the slots 52, it is possible to tilt the planet wheel axles relative to axis A of planetary transmission 10, so that the tilting movement is about the Y-axis (see FIG. 4). In that regard, the Y-axis corresponds to a tangential direction of the planetary transmission. As can best be seen in FIG. 3, by adjusting the relative positions of the slots 52 in the circumferential direction of the planetary transmission, as well as the slot width B, it is possible to establish the amount of play between the end regions 40 of planet wheel axle 30 and the slot 52 and thus the possible tipping angle or tilt angle of the axis of planet wheel 14 about the Z-axis (see FIG. 4) which is brought about by applying a tipping moment τ. A tipping moment τ about the Z-axis is thus introduced by planet wheel axle 30 into web element 50. The flattened ends 39 in the end regions 40 of the axle in combination with the corresponding geometry of the slots 52 of web element 50 contributes to reducing the resulting pressure between those parts, so that the sliding properties of planet wheel axle 30 are favorable even during adjustments in the transmission ratio.

As can best be seen in FIG. 3, web element 50 as shown is essentially in the form of two plates, with the slots 52 for the axial ends of the planet wheel axles 30 on the output side of the planetary transmission being provided in one plate element and the slots 52 for the ends of the planet wheel axles 30 on the input side of the transmission being provided in the other plate element. The two plate elements of the web element are preferably connected to each other between the planet wheels and/or in the region of the shaft 20 by a shaft sleeve 54, which fixes web element 50 in the radial direction on shaft 20 but allows it to shift axially. Thus, it is possible by movement of web element 50 in the axial direction of shaft 20 to set different contact radii, relative to shaft 20, between surfaces 18a, 18b of sun wheels 12a, 12b and the end surfaces 34a, 34b of planet wheels 14, and between inner surfaces 36 of planet wheels 14 and the inner circumferential surface 42 of ring wheel 16, and thereby to achieve different transmission ratios. The adjustment is simple if the planet wheels 14 are supported in the slots 52 and by the web element 50 in such a way that they are moved in the axial direction along with the web element.

In addition, a gear (not shown) can be provided on web element 50 to enable the introduction or the extraction of torque into or out of web element 50 through the gear. That makes it possible to design web element 50 as an input or an output drive, or to non-rotatably connect it to the housing of planetary transmission 10. Because one element of planetary transmission 10, namely any of either the sun wheels 12a, 12b, or ring wheel 16, or web element 50, is held firm in terms of a rotational movement around axis A, the other two elements can thus be used as input or output drive elements, and different transmission ratio ranges of the planetary transmission can be produced thereby.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A planetary transmission having a continuously variable transmission ratio, said transmission comprising: two axially spaced, coaxial sun wheels having sun wheel circumferential surfaces and that are rotatable independently of each other; a ring wheel having an internal circumferential surface positioned coaxially with the sun wheel axis; and planet wheels having planet wheel circumferential surfaces, each of which planet wheels is in frictional contact with the internal circumferential surface of the ring wheel and with the sun wheel circumferential surfaces; and a web element for rotatably supporting the planet wheels, wherein the planet wheels are each rotatable about an associated planet wheel axle that has at least one axial end carried by the web element and that it is guided by the web element for movement in a radial direction relative to the sun wheel axis.

2. A planetary transmission in accordance with claim 1, wherein the planet wheel axles are carried by and radially guided by the web element at each opposite axial end of the respective planet wheel axles.

3. A planetary transmission in accordance with claim 1, wherein a common web element carries the axles of all planet wheels.

4. A planetary transmission in accordance with claim 1, wherein the web element is non-rotatably connected to a gear to introduce an input drive torque or to extract an output drive torque.

5. A planetary transmission in accordance with claim 4, wherein the web element is non-rotatably connected to a planetary transmission housing.

6. A planetary transmission in accordance with claim 1, wherein the web element is non-rotatably connected to a transmission housing.

7. A planetary transmission in accordance with claim 1, wherein the planet wheel axle includes flattened ends that are received in and guided by the web element in radially-extending slots provided in the web element.

8. A planetary transmission in accordance with claim 1, wherein the web element includes a shaft sleeve with by which it is supported on a shaft connected with at least one sun wheel so that the web element is radially fixed relative to the shaft.

9. A planetary transmission in accordance with claim 1, wherein the web element is movable in the axial direction of the transmission together with the planet wheels.

* * * * *